(12) United States Patent
Sanada et al.

(10) Patent No.: US 8,653,713 B2
(45) Date of Patent: Feb. 18, 2014

(54) MAGNETIC CIRCUIT STRUCTURE

(75) Inventors: Masayuki Sanada, Sakai (JP); Shigeo Morimoto, Hashimoto (JP)

(73) Assignee: Osaka Prefecture University Public Corporation, Osaka (JP)

( * ) Notice: Subject to any disclaimer, the term of this patent is extended or adjusted under 35 U.S.C. 154(b) by 143 days.

(21) Appl. No.: 13/262,892

(22) PCT Filed: Mar. 30, 2010

(86) PCT No.: PCT/JP2010/055653
§ 371 (c)(1),
(2), (4) Date: Oct. 4, 2011

(87) PCT Pub. No.: WO2010/116921
PCT Pub. Date: Oct. 14, 2010

(65) Prior Publication Data
US 2012/0025664 A1 Feb. 2, 2012

(30) Foreign Application Priority Data
Apr. 7, 2009 (JP) ................................. 2009-092936

(51) Int. Cl.
*H02K 1/08* (2006.01)
*H02K 1/06* (2006.01)
*H02K 37/04* (2006.01)

(52) U.S. Cl.
USPC ............................ 310/216.016; 310/216.091

(58) Field of Classification Search
CPC ....... H02K 2201/03; H02K 1/06; H02K 1/08; H02K 37/04; H02K 37/08
USPC .................. 310/168, 216.91, 216.92, 216.93, 310/219.94, 216.96, 269, 156.66, 156.69, 310/156.71, 156.73, 216.091, 310/216.015–216.019, 156.04
IPC ................................................. H02K 1/08,1/06
See application file for complete search history.

(56) References Cited

U.S. PATENT DOCUMENTS 6,870,295 B2 * 3/2005 Lim et al. ............... 310/216.001
2007/0145848 A1 * 6/2007 Nakahara et al. ........ 310/156.48

FOREIGN PATENT DOCUMENTS

| JP | 63-88071 U | 6/1988 |
| JP | 11-89193 A | 3/1999 |
| JP | 11-289726 A | 10/1999 |
| JP | 11-299131 A | 10/1999 |
| JP | 2004-364368 A | 12/2004 |
| JP | 2004364368 A | * 12/2004 |

(Continued)

*Primary Examiner* — Burton Mullins
*Assistant Examiner* — Michael Andrews
(74) *Attorney, Agent, or Firm* — McDermott Will & Emery LLP (57) ABSTRACT

A magnetic circuit structure, such as a motor, is provided with: a rotor having rotor-side magnetic poles formed on the outer surface; and a stator having stator-side magnetic poles formed on the inner surface. The magnetic circuit structure has an air gap between the outer surface of a rotor-side magnetic pole and the inner surface of a stator-side magnetic pole in the location where the rotor-side magnetic pole and the stator-side magnetic pole face each other. At least one pair of a protrusion and a recess is created so that the outer surface of a rotor-side magnetic pole and the inner surface of a stator-side magnetic pole face each other through the air gap in the direction of the actual line of the rotation axis, and each pair of a protrusion and a recess has two or three steps in the direction of the radius around the rotation axis.

3 Claims, 7 Drawing Sheets

(56) References Cited

FOREIGN PATENT DOCUMENTS

| | | | | |
|---|---|---|---|---|
| JP | 2005-124355 A | | 5/2005 | |
| JP | 2005160203 A | * | 6/2005 | |
| JP | 2008-141900 A | | 6/2008 | |
| WO | WO 2006051318 A1 | * | 5/2006 | |

* cited by examiner

(a) One-protrusion step     (b) Two-protrusion step     (c) Three-protrusion step

Fig. 7

MAGNETIC CIRCUIT STRUCTURE

CROSS REFERENCE TO PRIOR APPLICATIONS

This application is a U.S. National Phase application under 35 U.S.C. §371 of International Application No. PCT/JP2010/055653, filed on Mar. 30, 2010 and claims benefit of priority to Japanese Patent Application No. 2009-092936, filed on Apr. 7, 2009. The International Application was published in Japanese on Oct. 14, 2010 as WO 2010/116921 under PCT Article 21(2). All of these applications are herein incorporated by reference.

TECHNICAL FIELD

The present invention relates to a magnetic circuit structure formed of a rotor or a mover and a stator. The magnetic circuit structure according to the present invention is typically used as a motor, a power generator and an actuator.

BACKGROUND ART

The development of motors for cars and machine tools, for example, that can be mass produced at low cost and have high torque performance has been desired. In addition, the development of power generators having high efficiency in power generation has also been desired.

In general, the torque performance and the efficiency in power generation of motors depend on the amount of magnetic flux in the air gap between the rotor or mover and the stator, and therefore it is necessary to increase the amount of magnetic flux in the air gap in order to improve the torque performance.

In the following, the torque performance of a motor that is cited as an example is described, but power generators and the like have the same principle torque performance.

It is possible to use magnets having a very strong magnetic force, such as rare earth magnets, in order to increase the amount of magnetic flux in the air gap. However, it is necessary to refrain from using rare earth metals in order to save the rare earth metals resources and lower the cost.

In accordance with another method for improving the torque performance, the air gap (distance between the rotor and the stator) is shortened so as to reduce the magnetic resistance, and thus the amount of magnetic flux is increased. A reluctance motor having an air gap of 0.3 mm has been disclosed as an example (see Japanese Unexamined Patent Publication H11 (1999)-89193).

As described above, the torque performance can be improved by shortening the air gap. In the case where the air gap is shorter than 0.3 mm, the amount of magnetic flux is further increased and the torque performance is further improved. However, it means that the rotor and the stator too close to each other, which increases the risk of the two making contact when the rotor thermally expands. In addition, the shorter the air gap is, the higher the precision is with which the components are positioned at the time of assembly, and therefore it basically ends up costing more for assembly. Thus, there is a practical limit in shortening the gap.

An object of the present invention is to provide a magnetic circuit structure, such as a motor, where the torque performance is improved by increasing the amount of magnetic flux in the air gap while maintaining the air gap at approximately 0.3 mm instead of shortening the air gap more.

Another object of the invention is to provide a magnetic circuit structure having the same or higher torque performance than the conventional magnetic circuit structure without increasing the manufacturing cost.

Still another object of the present invention is to provide a magnetic circuit structure that can improve the torque performance when the magnetomotive force is large.

SUMMARY

In order to achieve the above-described objects, the present invention figures out an appropriate shape of the air gap through which the rotor magnetic poles and stator magnetic poles face each other so that the amount of magnetic flux that passes through the air gap increases, and thus the torque performance is improved. The air gap of the conventional magnetic circuit structures has such a shape that flat surfaces face each other. In contrast, in the case where the air gap has been changed to a special three-dimensional shape, it is found through the calculation on the basis of the finite element analysis that the same effects as when the air gap is shortened can be gained in a region where the magnetomotive force is large.

That is to say; the magnetic circuit structure according to the present invention is a magnetic circuit structure having: a rotor that is supported so as to be rotatable around a rotation axis and has a number of rotor-side magnetic poles formed on the outer surface thereof; and a stator that is placed so as to surround the outside of the above-described rotor-side magnetic poles and has a number of stator-side magnetic poles formed on the inner surface thereof, wherein the magnetic circuit structure has such a structure that there is an air gap between the outer surface of a rotor-side magnetic pole and the inner surface of a stator-side magnetic pole in the location where the rotor-side magnetic pole and the stator-side magnetic pole face each other, and the air gap portion is provided in the following structure. That is to says at least one pair of a protrusion and a recess is created so that the outer surface of a rotor-side magnetic pole and the inner surface of a stator-side magnetic pole face each other through the air gap in the direction of the actual line of the rotation axis, and each pair of a protrusion and a recess has two or three steps in the direction of the radius around the rotation axis where the air gap in the direction of the radius is maintained to be constant along the rotation axis.

In addition, the relationship of the above-described rotor and stator may be opposite between the inside and the outside. That is to say; the magnetic circuit structure is provided with: a rotor that is supported so as to be rotatable around a rotation axis and has a number of rotor-side magnetic poles formed on the inner surface thereof; and a stator that is placed inside the rotor-side magnetic poles and has a number of stator-side magnetic poles formed on the outer surface thereof, wherein the magnetic circuit structure has such a structure that there is an air gap between the inner surface of a rotor-side magnetic pole and the outer surface of a stator-side magnetic pole in the location where the rotor-side magnetic pole and the stator-side magnetic pole face each other, and at least one pair of a protrusion and a recess is created so that the inner surface of a rotor-side magnetic pole and the outer surface of a stator-side magnetic pole face each other through the air gap in the direction of the actual line of the rotation axis, and each pair of a protrusion and a recess has two or three steps in the direction of the radius around the rotation axis where the air gap in the direction of the radius is maintained to be constant along the rotation axis.

In addition, the air gap is 0.3 mm in the above-described invention.

In the above-described invention, the rotor and the stator are respectively formed by layering three steel plates having different forms on top of each other in the case where each pair of a protrusion and a recess has two steps in the direction of the radius around the rotation axis. In addition, the rotor and the stator are respectively formed by layering four steel plates having different forms on top of each other in the case where each pair of a protrusion and a recess has three steps in the direction of the radius around the rotation axis.

According to an example, there are two steps (referred to as two-protrusion steps for the sake of convenience) or three steps (referred to as three-protrusion steps for the sake of convenience) in the direction of the radius of the rotation axis in the air gap portion, and thus the area in the gap portion through which magnetic poles face each other can be large and the magnetic resistance can be small. At this time, the magnetic fluxes that pass through the air gap are diagonal in the corners of the steps in the air gap portion, which has the same effects as for the gap to be longer locally. In the case of the two-protrusion steps or the three-protrusion steps, however, the number of corners is small and the effects of lowering the magnetic resistance resulting from an increase in the area through which the magnetic poles face each other are greater than the effects due to an increase in the number of corners, and thus the torque performance can be improved. Here, in the case where the number of steps in the direction of the radius of the rotation axis is one (referred to as one-protrusion step for the sake of convenience), the torque performance is improved when the magnetomotive force is small, but the density of the magnetic flux is high locally, causing magnetic saturation when the magnetomotive force is large, and thus the torque performance is rather poor when strongly affected by the magnetic saturation. Therefore, the air gap portion has a special shape, such as a two-protrusion step or a three-protrusion step, instead of a simple one-protrusion step so that the torque performance can be improved when the magnetomotive power is large.

In the magnetic circuit structure according to the present invention, the torque performance can be improved when the magnetomotive force is large, and thus magnetic circuit structures, such as powerful motors and power generators, can be formed without using rare earth metals or narrowing the air gap.

BRIEF DESCRIPTION OF THE DRAWINGS

FIGS. 2(a) to 2(h) are diagrams showing models of air gaps in various shapes;

FIGS. 4(a) to 4(f) are diagrams showing the lines of magnetic flux of each model;

FIGS. 6(a) to 6(c) are diagrams showing the lines of magnetic flux of each model.

DETAILED DESCRIPTION

Simple magnetic circuits were used for the calculation on the basis of the finite element analysis in order to find the effects of the shape of the air gap on the magnetic flux when the shape was varied. The results are described below. The present examples were made based on such findings that the torque performance can be increased when the magnetomotive force is large in the case where the air gap has a certain shape, judging from the results of the calculation.

Figure 1:
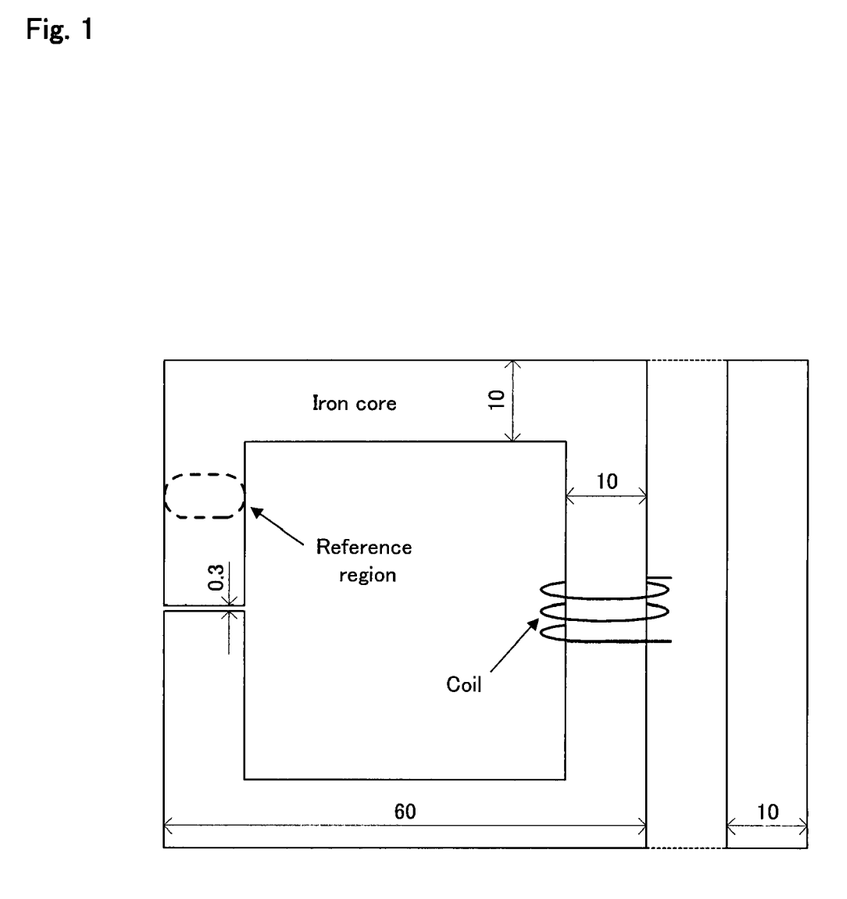
FIG. 1 is a diagram showing a simple magnetic circuit with an air gap for illustrating the calculation on the basis of the finite element analysis.

FIG. 1 shows a simple magnetic circuit with an air gap for the calculation on the basis of the finite element analysis. This magnetic circuit is made of a rectangular iron core and has such circuit structure that there is an air gap on the left and a coil for excitation wound on the right. The air gap portion in the figure has a normal gap where the facing surfaces are flat. The gap (distance) is set to 0.3 mm and a magnetic circuit having the set values in Table 1 is used. This is referred to as normal model.

TABLE 1

| Items | Value |
| --- | --- |
| Length of one side | 60 mm |
| Width of magnetic path | 10 mm |
| Layer thickness | 10 mm |
| Number of windings of coil | 300 turns |
| Type of silicon steel plate | 35SXH300 |

FIGS. 2(a) to 2(h) show various models gained by modifying the above-described normal model in such a manner that the distance in the gap portion is shortened, the facing surfaces are changed so as to be uneven, and the facing surfaces are changed to a V shape.

Figure 2:
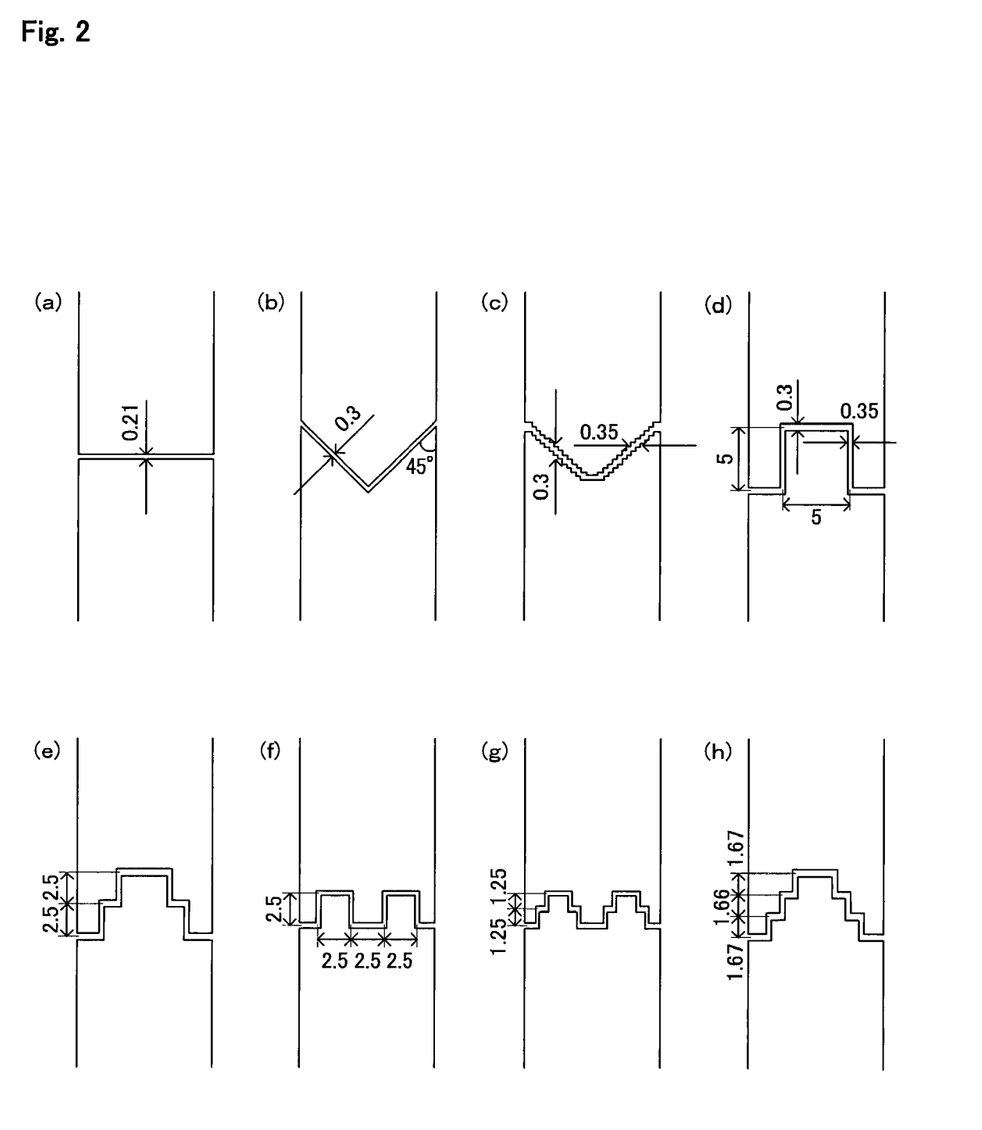

That is to say, FIG. 2(a) shows a model where the gap is shortened to 0.21 mm (shortened to 70% from 0.3 mm), which is referred to as 0.21 mm model. This model is referred to in order to find how much the gap should be shortened in order to improve the torque performance by approximately 30% in comparison with the normal model.

FIG. 2(b) shows a model where the gap is 0.3 mm and is in a V shape, which is referred to as V-shape gap model.

FIG. 2(c) shows a model made of electromagnetic steel plates (silicon steel plates) having a thickness of 0.35 mm where the size of each electromagnetic steel plate varies little by little and the gap is maintained at 0.3 mm and is in a V shape as a whole, which is referred to as V-shape gap (protrusion) model.

FIG. 2(d) shows a model where there is one pair of a protrusion and a recess where the number of steps in the direction of the axis is one, which is referred to as one-protrusion step model. The distance between the center of the air gap at different levels or locations is 5 mm both in the direction of the axis and in the direction of the radius.

FIG. 2(e) shows a model where there is one pair of a protrusion and a recess where the number of steps in the direction of the axis is two, which is referred to as two-protrusion step model.

FIG. 2(f) and FIG. 2(g) show models where two half-size one-protrusion step models and two half-size two-protrusion step models are aligned side by side in the direction of the axis, which are referred to as one-protrusion step×2 model and two-protrusion step×2 model.

FIG. 2(h) shows a model where there is one pair of a protrusion and a recess where the number of steps in the direction of the axis is three, which is referred to as three-protrusion step model.

The models in FIGS. 2(c) to 2(h) have gaps of 0.3 mm in the direction of the radius (longitudinal direction) and gaps of 0.35 mm in the direction of the axis (lateral direction). This is because the rotor and the stator are fabricated by layering electromagnetic steel plates with curves having different diameters (outer diameters of the magnetic pole portions on the rotor side and inner diameter of the magnetic pole portions on the stator side) on top of each other with a gap provided in between, and therefore the gap in the direction of the axis is regulated by the thickness of the steel plates (0.35 mm) as described below. In the case where electromagnetic steel plates are layered on top of each other, electromagnetic steel plates having a great number of different diameters are required for a V-shape model, while the rotor and the stator are respectively fabricated by layering electromagnetic steel plates having only two different diameters for the one-protrusion step model, and electromagnetic steel plates having only three or four different diameters are layered on top of each other for the two-protrusion step model and three-protrusion step model.

Here, the amount of magnetic flux that passes through the air gap portion differs depending on the area through which the magnetic poles face each other, and therefore the models in FIGS. 2(d) to 2(h) have a gap portion in the level range of 5 mm in the longitudinal direction (total height of the step) so that the area through which the magnetic poles face each other with the air gap in between is two times greater than that in the normal model in FIG. 2(a) (the length of the gap in the lateral direction (layer thickness) is approximately 10 mm).

The two-dimensional finite element analysis was used to analyze the magnetic field. A direct current excitation was carried out for the analysis by changing the coil current (corresponding to the magnetomotive force) by 0.1 A in a range from 0.1 A to 0.6 A, by 0.2 A in a range from 0.8 A to 1.2 A, and by 0.5 A in a range from 1.5 A to 2 A. In order to examine the amount of magnetic flux that passes through the vicinity of the air gap, the value of the magnetic flux density B in the region indicated by a broken line in FIG. 1 was used. This is because the magnetic flux density locally changes in the vicinity of the gap in protrusion models, and therefore the amount of magnetic flux $\phi$ that passes through the gap ($\phi$=BS, S is the cross-sectional area of the magnetic path) cannot be found from the magnetic flux density B.

In the present example, how to increase the magnetic flux density is focused on in a region where the electromotive force is large by increasing the exciting current to 0.8 A or higher.

Figure 3:
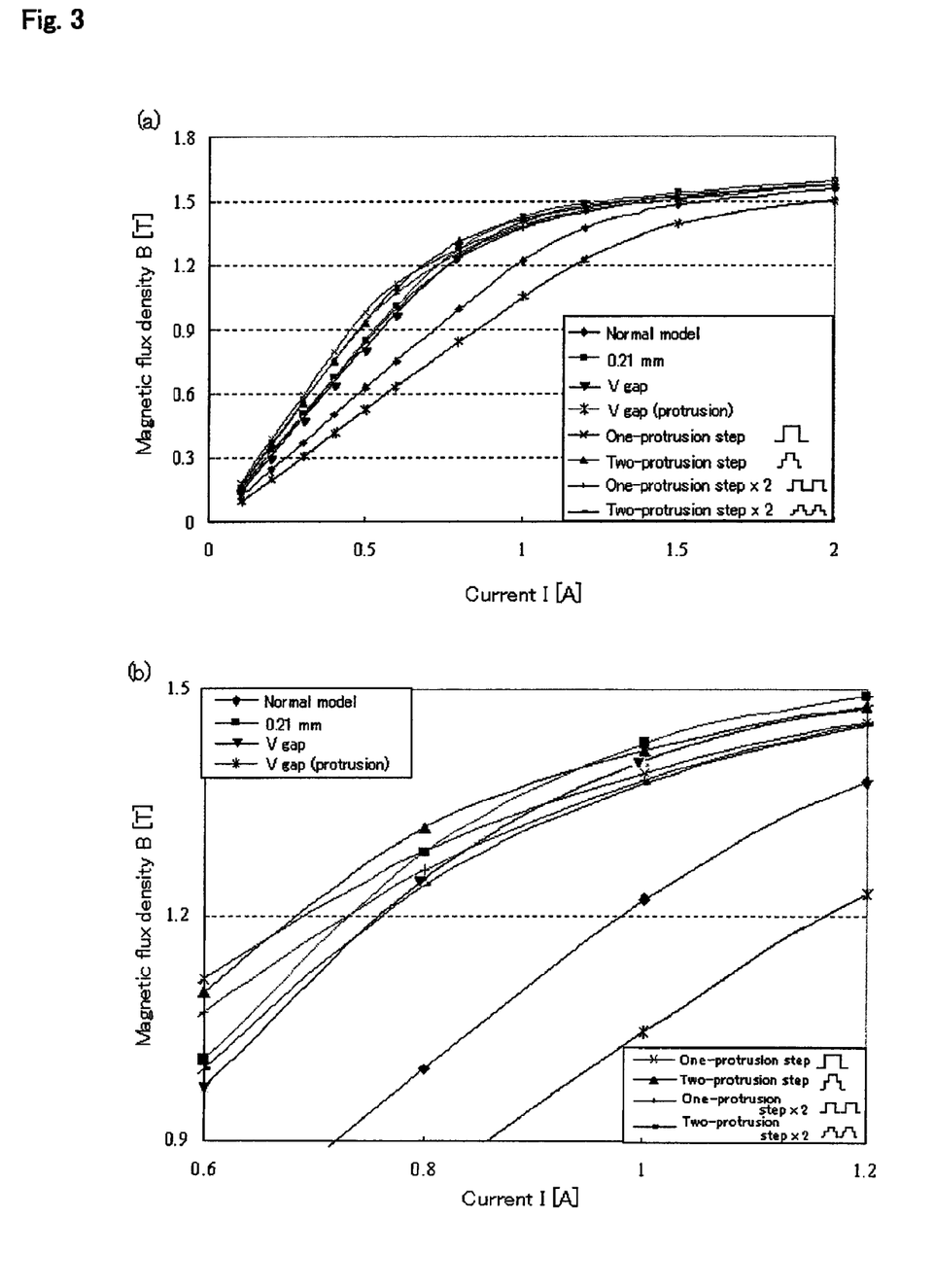
FIGS. 3(a) and 3(b) are graphs showing the exciting current-magnetic flux density characteristics of each model.

Next, the results of the finite element analysis are described. FIG. 3(a) is a graph showing the exciting current-magnetic flux density characteristics of coils having air gaps in various shapes, and FIG. 3(b) shows an enlargement of the portion between 0.6 A to 0.8 A in FIG. 3(a).

FIGS. 4(a) to 4(f) are diagrams showing magnetic flux lines in the vicinity of the air gap that have been calculated on the basis of the finite element analysis in the normal model, the V gap (protrusion) model, the one-protrusion step model, the two-protrusion step model, the one-protrusion step×2 model and the two-protrusion step×2 model.

As shown in FIGS. 3(a) and 3(b), the magnetic flux density is high in the one-protrusion step model when the exciting current (magnetomotive force) is small and in a range from 0.1 A to 0.6 A, while the magnetic flux density is high in the two-protrusion step model as a result of improvement when the exciting current is in a range from 0.8 A to 2 A. In addition, the one-protrusion step×2 model has slightly poorer performance than the one-protrusion step model. Likewise, the two-protrusion×2 model has slightly poorer performance than the two-step protrusion model.

As a result of the above, the one-protrusion step model is preferable when the magnetomotive force is small, but the two-protrusion step model is superior when the magnetomotive force is large.

Figure 4:
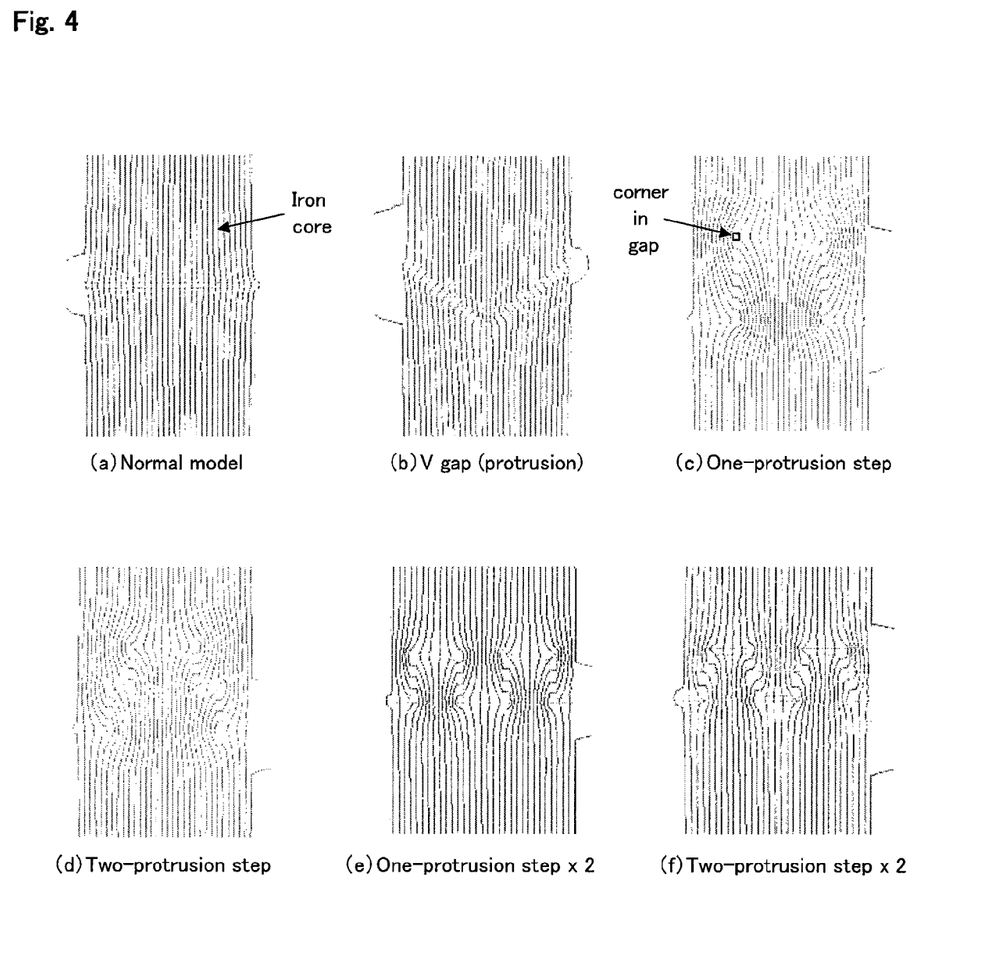

Meanwhile, the V-shape gap (protrusion) model, which is a comparative example, has poorer performance than the normal model. This is considered to be because the gap is increased locally. That is to say; as shown in FIG. 4(b), the entirety of the magnetic flux passes through the air gap diagonally due to the effects by the corners that are provided continuously along the air gap, and as a result it is possible for the gap to be practically increased. The greater the number of corners in the air gap portion is, the more significant the effects appear due to the corners, which results in an increase in the gap, and this is considered to be because the performance of the V-shape (protrusion) model is extremely poor. As for the comparison between the one-protrusion step×2 model or the two-protrusion step×2 model and the one-protrusion step model or the two-protrusion step model, the one-protrusion step×2 model and the two-protrusion step×2 model having a greater number of corners in the air gap portion have poorer performance.

In FIGS. 3(a) and 3(b), the characteristics are affected by the magnetic saturation when the exciting current is 0.6 A or higher in such a way that the ratio at which the magnetic flux density increases becomes small. Magnetic saturation tends to occur in regions where the lines of magnetic force concentrate in FIGS. 4(a) to 4(f), and therefore significant magnetic saturation occurs in the one-protrusion step model and the one-protrusion step×2 model where the magnetic flux density is very high locally. As compared to these, the two-protrusion step model and the two-protrusion step×2 model where regions having high magnetic flux density are not concentrated have good performance when the exciting current is 0.6 A or higher because their shapes make it more difficult for magnetic saturation to occur.

As a result of the above, it is better not to provide many steps in order to prevent the number of corners from being large, unlike the V-shape gap (protrusion) model. Meanwhile, when the number of steps is large, magnetic saturation tends to be mitigated. In the case where the number of steps is one, for example, the performance is good when the exciting current is small, but the performance is affected by magnetic saturation and tends to be poor when the magnetomotive force is large due to an increase in the exciting current.

It can be seen from the above that the effects of the corners become problematic when the number of steps in the protrusion models is high, and therefore the one-protrusion step model and the two-protrusion step model as well as the three-protrusion step model in FIG. 2(h) are compared to each other.

Figure 5:
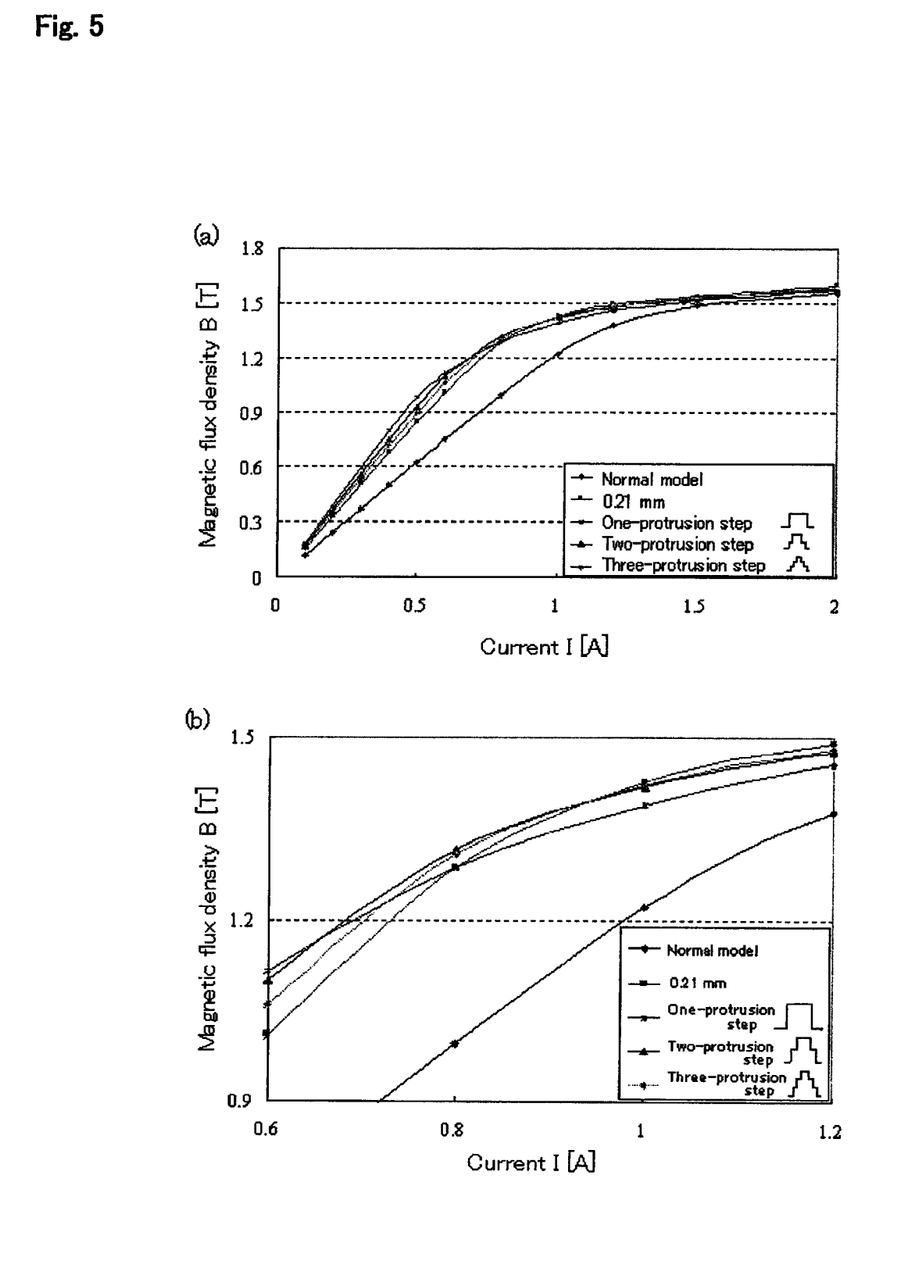
FIGS. 5(a) and 5(b) are graphs showing the exciting current-magnetic flux density characteristics for the comparison between models having a one-protrusion step, a two-protrusion step and a three-protrusion step.

FIG. 5(a) is a graph showing the exciting current-magnetic flux density characteristics of the coils when the one-protrusion step, two-protrusion step and three-protrusion step models are compared, focusing on the number of steps, and FIG. 5(b) is a graph showing an enlargement of a portion thereof. As shown in these graphs, the one-protrusion step model has superior performance in a range from 0.1 A to 0.6 A, the two-protrusion step model superior performance at the time of 0.8 A, and the three-protrusion step model has superior performance in a range from 1 A to 2 A.

Figure 6:
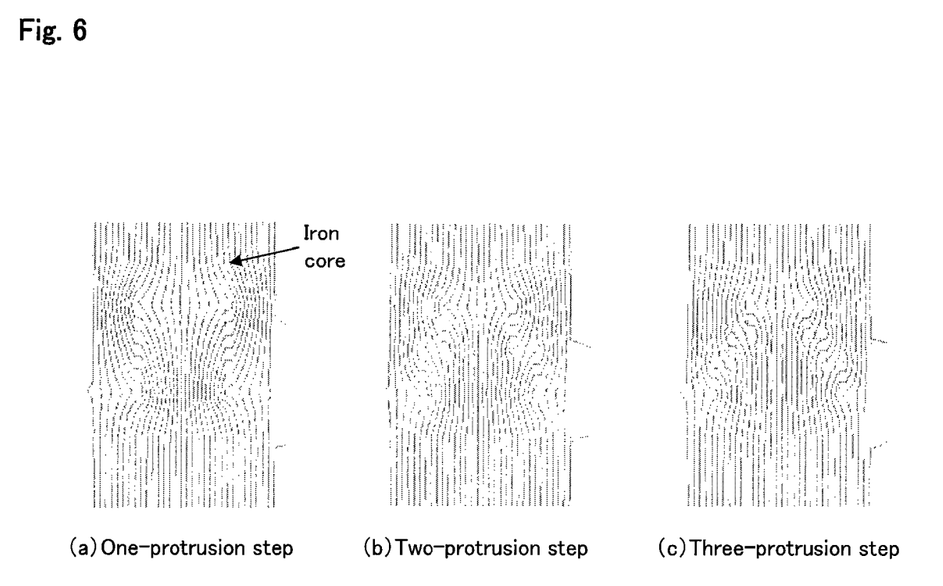

FIGS. 6(a) to 6(c) are diagrams showing the lines of magnetic flux in the one-protrusion step, two-protrusion step and three-protrusion step models. When the number of steps increases and the number of corners increases in the air gap, the lines of magnetic flux that pass through the air gap become diagonal, and thus the performance becomes poorer. Meanwhile, local concentrations of the lines of magnetic flux become weak and magnetic saturation is mitigated. As a result of the balance of these effects, the three-protrusion step model has better performance than the one-protrusion step and two-protrusion step models at 1 A or higher. The above results are summarized as follows. The one-protrusion step model is excellent in comparison with the normal model when the magnetomotive force is small with the exciting current being 0.6 A or lower, but the performance becomes poor when the magnetomotive force is large with the exciting current being 0.8 A or higher. In contrast, the two-protrusion step and the three-protrusion step models have excellent performance at 0.8 A or higher. When the number of steps is higher than theses, however, the effects of corners in the air gap become significant, and the effects of improving magnetic saturation cannot be better than that of the three-protrusion step model, and therefore the best effects can be gained when the number of steps is two or three.

The magnetic circuit structure according to the present example that was fabricated using the above results of analysis is described below.

The magnetic circuit structure according to one example of the present invention is a motor, which is described below in reference to the drawings. Here, the structure of the air gap portion is the same in the case where the invention is applied to other examples, such as power generators.

Figure 7:
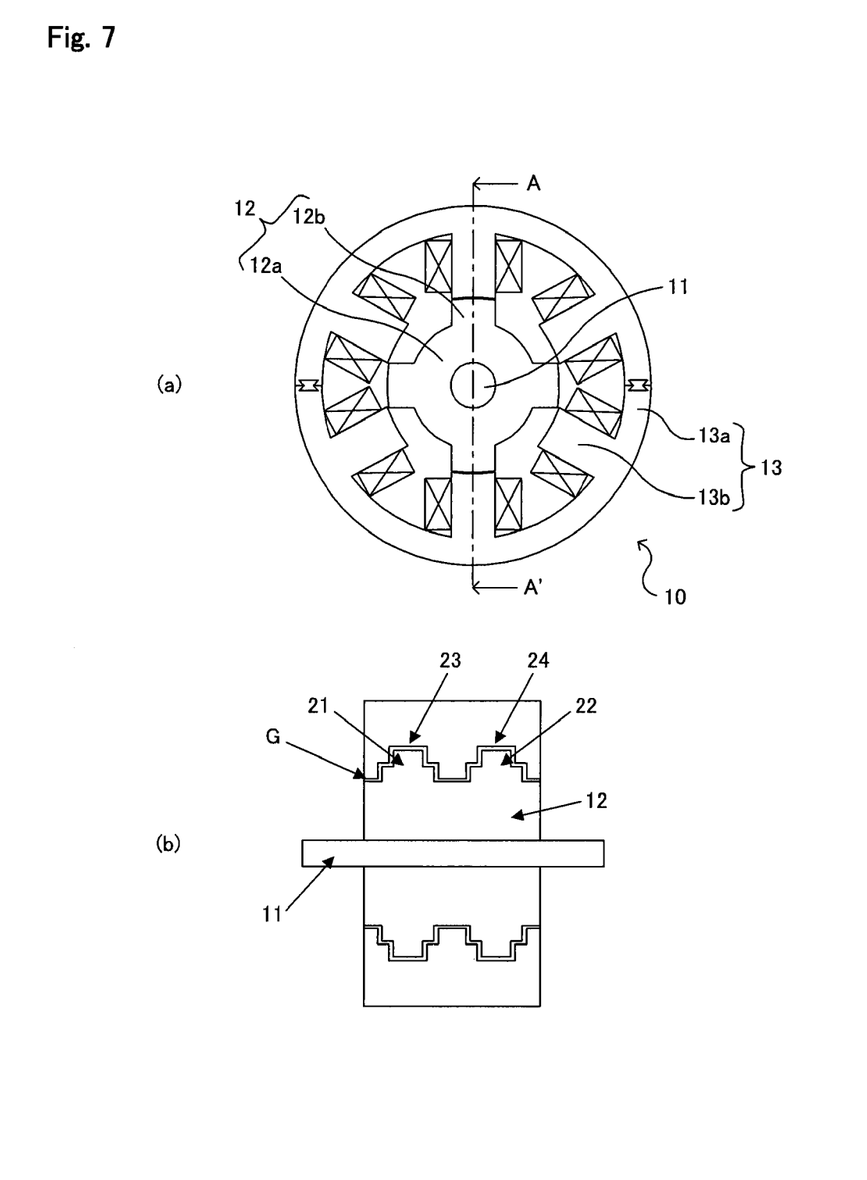
FIGS. 7(a) and 7(b) are diagrams showing the structure of the motor according to one embodiment of the present invention.

FIG. 7(a) is a front diagram showing the structure of the motor according to the present invention. The motor 10 is formed of a rotor 12 that rotates around a rotation axis 11 and an annular stator 13 placed on the outside of the rotor 12. The rotor 12 has four rotor-side magnetic poles 12b protruding from the main body 12a of the rotor towards the outside in the direction of the radius. In addition, the stator 13 has six stator-side magnetic poles 13a protruding from the main body 13a of the stator towards the inside in the direction of the radius.

FIG. 7(b) is a cross-sectional diagram along A-A' in FIG. 7(a) and shows the state where a rotator-side magnetic pole 12b of the rotor 13 comes to such a position as to face a stator-side magnetic pole 13b.

The rotor 12 and the stator 13 are respectively formed of a multilayer steel plate where thin electromagnetic steel plates having a thickness of 0.35 mm are layered on top of each other in the direction of the rotation axis in order to prevent ion loss.

Thus, the outer surface of the rotor-side magnetic pole 12b and the inner surface of the stator-side magnetic pole 13b face each other in such a manner that at least a pair of a protrusion and a recess engage with each other with an air gap G in between in the direction of the axial line of the rotation axis. The air gap is 0.3 mm, and thus the precision for positioning is the same as in the prior art.

The shape of the air gap is described below. In the example in FIG. 7(b), two protrusions 21 and 22 are formed on the rotor-side magnetic pole 12b, and two recesses 23 and 24 are created in the locations corresponding to these in the stator-side magnetic pole 13b. The protrusions 21 and 22 on the rotor-side magnetic pole 12b respectively have two steps in the direction of the radius, and the recesses 23 and 24 in the stator-side magnetic pole 13b also have two steps. The space between these steps is the air gap G, and therefore the areas facing each other with the air gap G in between are large in comparison with the case where the facing surfaces are flat. The air gap portion where the protrusion 21 and the recess 23 engage with each other has eight corners in total.

When the magnetomotive force is large, the motor having an air gap in this shape can have a torque performance higher than the motor having an air gap in the conventional shape where flat surfaces face each other.

In the above embodiment, the two-protrusion step×2 model in FIG. 2(g) is adopted for a motor, and a high torque performance can be gained when the magnetomotive force is large also in the case where the two-protrusion step model in FIG. 2(e), the three-protrusion step model in FIG. 2(h) or the three-protrusion step×2 model is adopted instead. Meanwhile, in the case where the number of steps is four or more, the large number of corners has a greater effect, and the effects cannot be gained by increasing the number of steps, and therefore desired effects can be gained in the two-protrusion step and three-protrusion step models.

In addition, the relationship between the rotor and the stator may be opposite between the inside and the outside, and the rotor may be formed as a mover. In this case, the rotor 12 in FIGS. 7(a) and 7(b) is switched to the stator 12', and the stator 13 in FIGS. 7(a) and 7(b) is switched to the rotor 13', though not shown, and the rotor 13' and the rotation axis 11 are connected through a connection member outside the stator 12'.

The present invention can be applied to a magnetic circuit structure, such as a motor.

The invention claimed is:

1. A magnetic circuit structure, comprising:
   a rotor that is supported so as to be rotatable around a rotation axis and has a number of rotor-side magnetic poles formed on the outer surface thereof; and
   a stator that is placed so as to surround the outside of said rotor-side magnetic poles and has a number of stator-side magnetic poles formed on the inner surface thereof, wherein
   the magnetic circuit structure has such a structure that there is an air gap between the outer surface of a rotor-side magnetic pole and the inner surface of a stator-side magnetic pole in the location where the rotor-side magnetic pole and the stator-side magnetic pole face each other,
   at least one pair of a protrusion and a recess is created so that the outer surface of a rotor-side magnetic pole and the inner surface of a stator-side magnetic pole face each other through said air gap in the direction of the actual line of the rotation axis, and each pair of a protrusion and a recess has two or three steps in the direction of the radius around the rotation axis where the air gap in the direction of the radius is maintained to be constant along the rotation axis, and
   said rotor and said stator are respectively formed of four types of multilayer steel plates having different forms in the case where each pair of a protrusion and a recess has three steps in the direction of the radius around the rotation axis.

2. A magnetic circuit structure, comprising:
   a rotor that is supported so as to be rotatable around a rotation axis and has a number of rotor-side magnetic poles formed on the inner surface thereof; and
   a stator that is placed inside said rotor-side magnetic poles and has a number of stator-side magnetic poles formed on the outer surface thereof, wherein
   the magnetic circuit structure has such a structure that there is an air gap between the inner surface of a rotor-side magnetic pole and the outer surface of a stator-side magnetic pole in the location where the rotor-side magnetic pole and the stator-side magnetic pole face each other,
   at least one pair of a protrusion and a recess is created so that the inner surface of a rotor-side magnetic pole and the outer surface of a stator-side magnetic pole face each other through said air gap in the direction of the actual line of the rotation axis, and each pair of a protrusion and a recess has two or three steps in the direction of the radius around the rotation axis where the air gap in the direction of the radius is maintained to be constant along the rotation axis, and said rotor and said stator are respectively formed of four types of multilayer steel plates having different forms in the case where each pair of a protrusion and a recess has three steps in the direction of the radius around the rotation axis.

3. The magnetic circuit structure according to claim 1, wherein said air gap is 0.3 mm.

* * * * *